J. ELLMAUER.
AUTOMATIC SEALER AND LUBRICATOR FOR REFRIGERATING COMPRESSORS.
APPLICATION FILED OCT. 7, 1919.

1,336,076.   Patented Apr. 6, 1920.

Inventor
J. Ellmauer

By J. H. Bryant.
Attorney

UNITED STATES PATENT OFFICE.

JOSEF ELLMAUER, OF MILWAUKEE, WISCONSIN.

AUTOMATIC SEALER AND LUBRICATOR FOR REFRIGERATING-COMPRESSORS.

1,336,076.  Specification of Letters Patent.  Patented Apr. 6, 1920.

Application filed October 7, 1919. Serial No. 329,167.

*To all whom it may concern:*

Be it known that I, JOSEF ELLMAUER, a citizen of the United States of America, residing at Milwaukee, in the county of Milwaukee and State of Wisconsin, have invented certain new and useful Improvements in Automatic Sealers and Lubricators for Refrigerating-Compressors, of which the following is a specification.

A serious objection to the household use of a refrigerating machine has always been the escape of gas through the driving mechanism of the compressor and my invention is primarily designed for preventing the leaking of gas around the driving shaft of the compressor.

A further object of my invention is to provide a compressor for household refrigerating machines that not only prevents the escape of gas but also insures perfect lubrication of the compressor mechanism, the structure being inexpensive of installation and perfectly performing the objects for which it is designed.

A still further object of my invention is to provide an automatic sealer for the crank case of compressors and similar machines whereby the lubrication of the bearings thereof forms an adequate seal preventing the escape of gas from the crank case.

With these general objects in view and others that will become apparent as the nature of the invention is better understood, the same consists in the novel form, combination, construction and arrangement of parts hereinafter more fully described, illustrated in the accompanying drawing, and pointed out in the claims.

Figure 1:
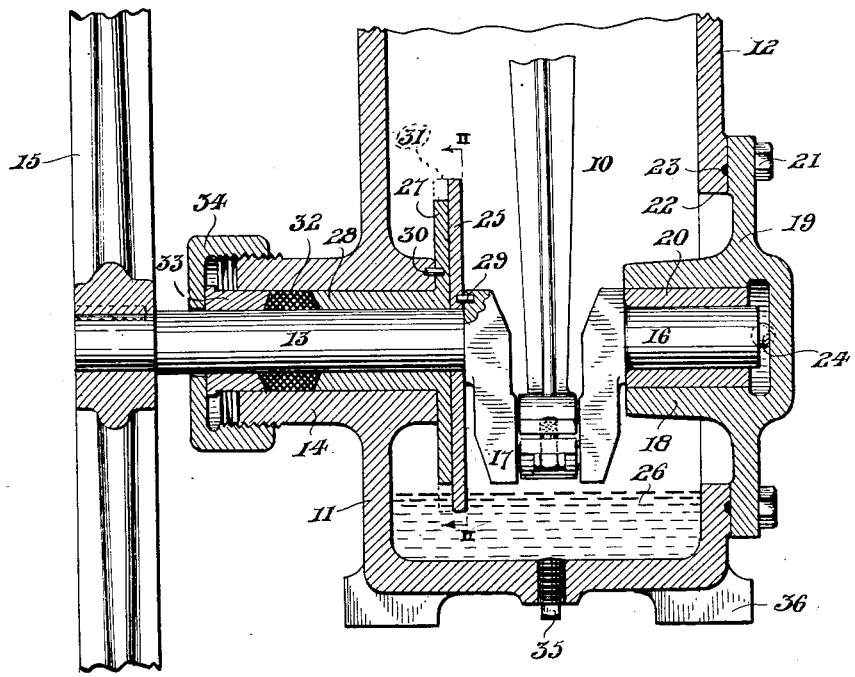
Figure 2:
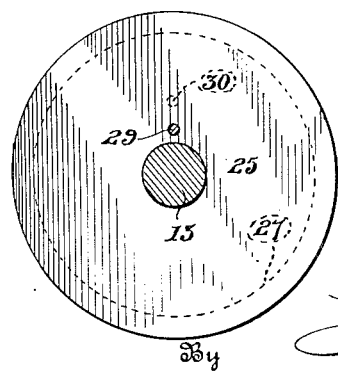

In the drawing forming a part of this application and in which like reference characters designate corresponding parts throughout the several views, Figure 1 is a vertical sectional view through the compressor of a refrigerating machine, illustrating my invention installed thereon, and Fig. 2 is a vertical sectional view taken upon line II—II of Fig. 1, showing the invention in elevation.

Referring more in detail to the drawing, it will be understood that my invention is especially adaptable for compressors of small refrigerating machines calculated for household use and the invention is herein illustrated in Fig. 1 installed within the chamber 10 of the crank case 11 of a compressor 12 and whereby the crank 13 and the mechanism operated thereby is lubricated while the escape of gas from the crank chamber 10 is prevented by the liquid seal formed by the lubricating fluid.

The shaft 12 extends through a journal bearing 14 at one side of the crank case 11 with a pulley or belt wheel 15 upon the outer end of the shaft while the opposite end portion 16 of the shaft 14 at the other side of the crank 17 is journaled in an inwardly projecting socket bearing 18 carried by a bearing head 19 secured to the crank case.

A bearing sleeve 20 in the socket 18 forms a journal for the shaft portion 16 serving the function of a thrust bearing if desired it being noted that the bearing head 19 is secured to the crank case 11 by stud bolts 21 thereby closing the side opening 22 of the case.

A packing 23 may be interposed between the head 19 and the adjacent side of the crank case 11 while an anti-friction ball 24 may be employed between the bearing head and the adjacent end of the crank shaft in the thrust bearing construction if found desirable.

A disk 25 of any desired size and form is carried for rotation by the crank shaft 13 with a portion of the disk adapted for submergence in the lubricating fluid 26 in the bottom of the crank case 11. The revolving disk 25 is adapted to coöperate with a suitable disk or flange 27 held stationary with the crank case and herein illustrated as a portion of the sleeve 28 within the bearing 14 and through which sleeve 28 the crank shaft 13 is journaled.

The disk 25 revolving with the shaft 13 during the operation of the compressor has wiping contact with the face of the relatively stationary flange 27 and carries some of the oil 26 between said disk and flange preventing any leaking of gas at the driving end of the crank shaft 13. The revolving disk 25 lubricates the pistons and bearings as well as the flange 27 after the manner of the splash system of lubrication, and a gas-tight crank case is easily provided in this manner.

The disk 25 may be of any desired form and it is herein illustrated secured by a pin 29 to the crank 17, of the shaft 13, but it will be understood that said disk 25 may be formed integral with said shaft or otherwise secured thereto if desired. The flange 27 is attached by a pin 30 to the bearing 14 but the same may be formed integral with the inner end of the bearing 14 or any other stationary portion of the crank case if desired and may also be of equal dimensions to the disk 25 as indicated by dotted lines 31.

A packing 32 surrounds the shaft 13 at the outer end of the sleeve 28 while a follower 33 is adapted to compress the packing 32 by means of a collar 34 threaded upon the outer end of the bearing 14 after the manner of a stuffing box. A plug 35 in the bottom of the casing 11 is serviceable in draining the oil 26 therefrom while corner feet 36 are provided for the crank case 11.

While the form of the invention herein shown and described is what is believed to be the preferred embodiment thereof, it is nevertheless to be understood that various forms, modifications and arrangements of the parts may be made without departing from the spirit and scope of the invention as claimed.

A film of oil will be constantly maintained between the adjacent faces of the disk 25 and flange 27 whether the compressor is running or idle, and the pressing of the disk 25 against the flange 27 is increased by the pressure in the crank case 11.

Having thus described my invention, what I claim as new and desire to secure by Letters Patent is:—

1. In a refrigerating compressor having a crank case and a crank shaft journaled therethrough, a flange member surrounding the shaft secured to the case, and an oil splashing member movable with the shaft adjacent the face of said flange whereby a fluid-tight oil seal is provided for the crank case.

2. A refrigerating compressor having a crank case, a bearing head secured to one side of the case, a journal bearing in the opposite side of the case, a crank shaft revolubly mounted in said head and bearing, a flange member secured within the crank case and an oil-splashing member secured to the shaft adapted for turning adjacent the flange member.

3. A refrigerating compressor having a crank case, a bearing head secured to one side of the case, a journal bearing in the opposite side of the case, a crank shaft revolubly mounted in said head and bearing, a sleeve surrounding the shaft within said bearing, a flange carried by the sleeve within the crank case and an oil-splashing disk member attached to the shaft for rotation therewith positioned flatly adjacent said flange.

4. A refrigerating compressor having a crank case, a bearing head secured to one side of the case, a journal bearing in the opposite sides of the case, a crank shaft revolubly mounted in said head and bearing, a sleeve surrounding the shaft within said bearing, a flange carried by the sleeve within the crank case, an oil-splashing disk member attached to the shaft for rotation therewith positioned flatly adjacent said flange, a packing surrounding the shaft, compressing means for the packing, and lubricating oil in the bottom of the crank case through which the peripheral portion of the disk member is adapted to pass.

5. In a compressor having a crank case, a removable bearing head at one side of the case having a socket projecting therein, a bearing at the opposite side of the case, a crank shaft journaled in said bearing and socket, a flange pinned to the inner end of the bearing and a disk pinned to the crank portion of said shaft for turning with the shaft, the bottom of the case being adapted for holding a lubricant.

6. In a refrigerating compressor having a crank case with a crank shaft journaled transversely therein, lubricating oil in the bottom of the crank case, a disk member secured to the crank portion of the shaft adapted to revolve therewith partially immersed in said lubricant and a flange member relatively fixed to the crank case and having an oil-receiving face flatly positioned adjacent the disk member adapted for forming an oil seal.

In testimony whereof I affix my signature.

JOSEF ELLMAUER.